Sept. 1, 1936.  P. J. BERGGREN  2,052,960
SHUTTER FOR MOTION PICTURE CAMERAS
Original Filed April 22, 1930  2 Sheets—Sheet 1
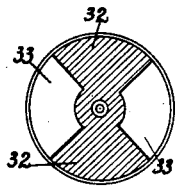 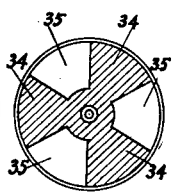 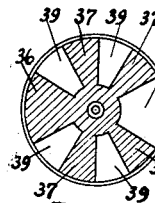  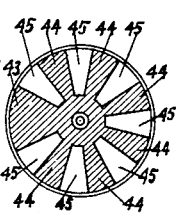
Fig. 1   Fig. 2   Fig. 3.   Fig. 4.   Fig. 5
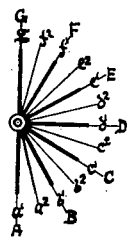 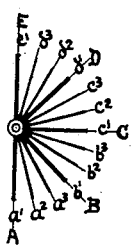 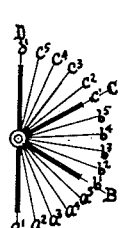 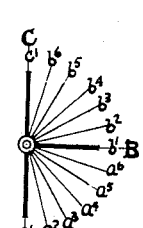 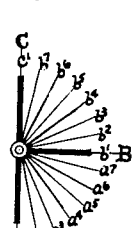
Fig. 6   Fig. 7.   Fig. 8   Fig. 9.   Fig. 10.
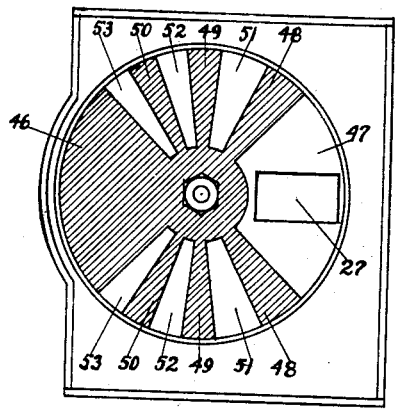
Fig. 11.
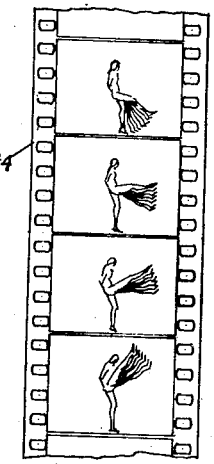
Fig. 12.
Per Johan Berggren.
INVENTOR.
BY *Lia*
Darby & Darby
ATTORNEYS Sept. 1, 1936.  P. J. BERGGREN  2,052,960
SHUTTER FOR MOTION PICTURE CAMERAS
Original Filed April 22, 1930  2 Sheets-Sheet 2

Per Johan Berggren
INVENTOR.

BY
Darby & Darby
ATTORNEYS.

Patented Sept. 1, 1936

2,052,960

UNITED STATES PATENT OFFICE 2,052,960

SHUTTER FOR MOTION PICTURE CAMERAS

Per Johan Berggren, New York, N. Y.

Application April 22, 1930, Serial No. 446,212
Renewed January 28, 1936

4 Claims. (Cl. 88—19.3)

The object of the invention is to provide a shutter structure for motion picture cameras particularly adapted for taking pictures of rapidly moving objects.

A further object of the invention is to provide a shutter of the nature referred to by the use of which a smooth and continuous action of a swiftly moving object is presented to the human optical system when the pictures are projected on a screen.

A further object of the invention is to provide a shutter structure by means of which during each individual frame a successive series of more or less superposed images of a swiftly moving object are recorded whereby when the picture is projected the effect is produced of portraying to the human senses an illusion of a smooth, continuous movement or action.

A further object of the invention is to provide a method of making motion pictures of swiftly moving parts according to which for each individual frame a succession of under-exposures of the swiftly moving parts of an object are recorded on the film whereby, when the picture is developed and projected, an illusion is imparted of a gradual fade in and fade out of the swiftly moving parts of the image.

Other objects of the invention will appear more fully hereinafter.

The invention consists substantially in the structure and method of operation as illustrated in the accompanying drawings and as hereinafter more particularly pointed out.

Referring to the accompanying drawings—

Figs. 1, 2, 3, 4, and 5 are views illustrating various modifications of shutters constructed and operating in accordance with the principles of my invention;

Figs. 6, 7, 8, 9, and 10 are diagrammatic views illustrating respectively the action of the shutter structures shown in Figs. 1 to 5, inclusive;

Fig. 11 is a view illustrating still another modified type of shutter structure embodying my invention;

Fig. 12 is a view of a portion of a picture film illustrating the effect of the structure shown in Fig. 11 over a series of individual frames;

Figure 13:
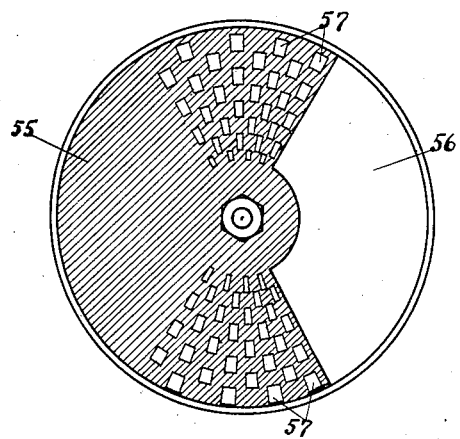
Figure 14:
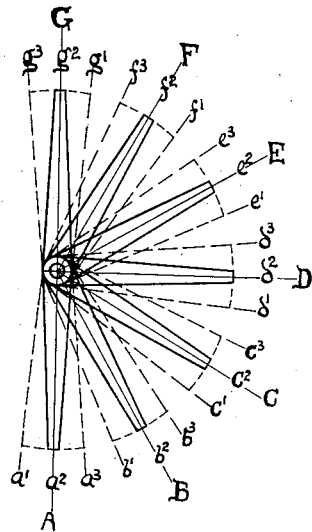
Figure 15:
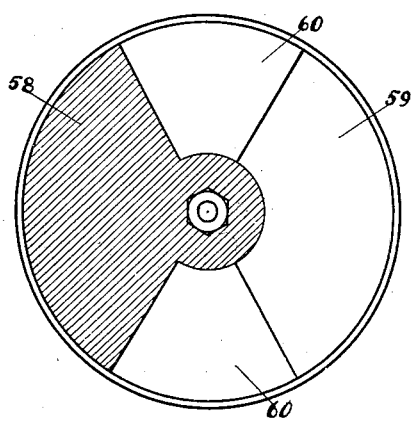
Figure 16:
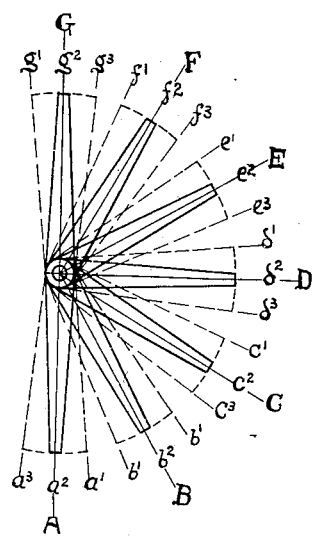

Figs. 13 and 15 are views illustrating still other modified types of shutters; and Figs. 14 and 16 are diagrams illustrating the action of the camera structures shown in Figs. 13 and 15, respectively.

In the usual form of camera shutter a disc is rotated in front of the aperture of the camera, the disc being formed with a cut out segmental portion, the cut out segment permitting exposure of the film through the aperture and the imperforate portion constituting the shutter proper. In the use of shutters of this form a single continuous exposure of the film to the image to be photographed, of longer or shorter duration, is made depending on the extent of the cut out and imperforate arcs of the shutter segments. In the use of the usual shutter structure in photographing moving objects, and particularly swiftly or rapidly moving objects, in order to secure the effect of continuous action when the pictures are projected, the common practice and aim is to secure a record on the film of a series of separate, equally exposed, sharply defined images, one for each exposure through the camera aperture, and this result is sought to be attained by reducing the arc of opening of the shutter. When the picture so taken is projected, however, instead of securing the illusion of a smooth continuous movement of the moving object in the projected picture, a successive series of more or less sharply defined images is produced and registers on the optical system of the observer. This result is highly undesirable as it imparts to the observer the effect of jerky and intermittent action, that is, a successive series of distinct images, whereas a smooth continuous action is desired. The reason for this defect which exists in motion pictures which are taken by cameras having the ordinary and usual shutter structures at present employed, is that, during the time intervening between the conclusion or ending of one exposure and the beginning of the next, the distance traversed by a swiftly moving body is so great that each succeeding image recorded on the film is a clearly defined image, and when a succession of clearly defined images of a swiftly moving object is projected on the screen there is a failure, due to persistency of vision, to create in the human eye or optical system the impression of a continuous movement, but, on the contrary, a succession of definite images, thereby causing each successive picture of the series to register upon the observer and to persist in his vision. The larger in size of the individual figures the more pronounced this effect becomes. In other words, according to the practice heretofore followed, the aim has been to secure a succession of equally exposed, sharply defined images in taking motion pictures of swiftly moving parts, whereas the result on the observer when such pictures are projected is to actually destroy continuity of movement of the parts, thereby giving the impression of a succession of impacts of the image upon the sensory nerves of the observer, similar in nature and character to the effects produced by undesirable jerky movements of the film during exposure, and by irregularities and other objectionable operations of the shutters commonly known as "flicker". It is among the special purposes of my present invention to provide a camera shutter structure and a method of operation which obviates and removes this exceedingly objectional characteristic and feature of present day structures and methods of operation of cameras heretofore used and methods of using the same, particularly in taking motion pictures of rapidly moving objects.

In accordance with my invention I propose to avoid the recording on the film of a succession of equally exposed distinct images of the rapidly moving bodies or parts thereof. Instead I propose, in accordance with my invention, to secure the effect when the picture is projected of a smooth and continuous moving action of the rapidly moving part, no matter how large the figure may be nor how swiftly the object is moving when it is recorded on the film. To secure this result, and it is a most important and highly desired result in the motion picture art, I propose to employ a shutter of such structure and method of operation that full exposure is possible or permissible only for stationary or slowly moving parts of the object to be photographed, and a series of under-exposure images is effected or permitted of the swiftly moving parts of the object, the degree of under-exposure of the successive images varying in accordance with the speed of action or movement, thereby producing on the film a succession of more or less dissolved images, in each frame whereby, when the picture is projected onto the screen, the impression registered on the observer is that of an entirely natural, smooth and continuous action or movement of the rapidly moving part, free from jerky or grotesque effects. In other words, instead of the persistency of vision carrying a series of defined images, there is only a suggestion of a movement which conveys to the mind of the observer a rapid movement of the parts of the object in question.

This result I secure by providing the shutter with a series of open segments so arranged and operating that during each individual frame, that is during each complete revolution of the shutter, the stationary or slowly moving parts of the object being photographed will be recorded on the film as a series or succession of coinciding exposures, constituting a full exposure, but the swiftly moving parts of the object will be recorded as a series or succession of non-coinciding or partially coinciding exposures, each of which will be an under-exposure, thereby producing on the film a more or less faded or dimmed under exposed record of the rapidly moving parts of the object, and a sharply defined and fully exposed record of the stationary and slow moving parts of the object.

I will now describe more in detail the nature and principles of my invention in comparison with present day practice and with reference to various shutter structures adaptable for carrying out the principles of my invention.

In Figs. 1 and 6 I have shown the shutter structure having two imperforate segments 32 and two open segments 33, of substantially equal areas. In this case, as indicated in Fig. 6, only two images are recorded in each frame, namely the positions $a^1$, $a^2$, intermediate the positions A, B; $b^1$, $b^2$ intermediate the positions B, C, etc., the recorded images of the positions $a^1$, $a^2$, $b^1$, $b^2$, $c^1$, $c^2$, etc. being a result of under exposure with the position A being the position of rest in starting the movement, and the position G being the position of rest at the termination of the movement, thereby securing the objects and purposes of my invention.

In Figs. 2 and 7 I have shown a shutter having three imperforate segments 34 and a corresponding number of opening segments 35, all of equal areas. Here starting from position A through to position E, there will be three exposures $a^1$, $a^2$, $a^3$, $b^1$, $b^2$, $b^3$, etc. in each frame, each being an under exposure. In this case only one-third of the full exposure is obtained in each individual record. But the result is that the initial and final positions, being positions of rest of the moving part, will be sharply defined because of three coinciding exposures being effected in those positions, whereas the intermediate exposures from position A to position E receive only one-third of the exposures of the initial and final ones.

In Figs. 3 and 8 I have shown a slightly different form of shutter having five imperforate segments 36, 37, the four segments 37 being of smaller area than the segment 36, and five open segments 38, 39, the opening 38 corresponding in area with imperforate segment 36, and the four open segments 39 being smaller and corresponding in area with the imperforate segments 37. This structure of shutter by reason of the enlarged area of open segment 38 will give an increased duration to the main exposure at each rotation of the shutter, with two exposures of shorter duration on each side of the main exposure, and for each frame of the film there will be five exposures in number, one of them being the main exposure of longer duration and the others relatively of under-exposure duration, as indicated at $a^1$, $a^2$, $a^3$, $a^4$, $a^5$, $b^1$, $b^2$, $b^3$, $b^4$, $b^5$, etc. In this case the exposure resulting from open segment 38 coming in register with the aperture will, of course, be of longer duration than that taking place when the other openings 39 come into register and, therefore, one of the series of recorded images $a^1$, $a^2$, $a^3$, $a^4$, $a^5$ will be more sharply defined than the others and will be preceded and also followed by two successive weaker or under-exposed images but still attaining the objects and purposes of my invention, all producing a succession of under-exposed images intervening between more sharply defined images due to a longer duration of exposure.

In Figs. 4 and 9 I have illustrated another structure wherein the shutter is provided with six imperforate segments, one of which, 40, being of greater area than the remaining segments 41. In this case there are six openings 42 of respectively equal area. The result will be, as indicated in Fig. 9, six weak or under-exposed images recorded on the film in each frame A to B, B to C, etc.

Substantially the same structure, arrangement and operation are illustrated in Figs. 5 and 10 except that there is one imperforate segment 43 of larger area and six imperforate segments 44 of smaller area and seven openings 45 of equal area. In this case there will be a succession of seven dim or weak images or under-exposed images recorded, as indicated at $a^1$, $a^2$, $a^3$, $a^4$, $a^5$, $a^6$, $a^7$, etc. in each frame.

In Fig. 11 I have shown a slightly different structure of shutter wherein an imperforate segment 46 of large area and an opening 47 of corresponding area are formed in the shutter with intervening imperforate segments 48, 49, 50 of relatively decreasing area and intermediate openings 51, 52, 53 of correspondingly decreasing areas.

In Fig. 12 I have shown a portion of a film 54 showing four framings illustrating the action of the shutter structure shown in Fig. 11. In each frame the image resulting from the exposure through the larger opening 47 is heavier or stronger than are the exposures effected through the openings 51, 52, 53, the heavier exposure through opening 47 being preceded by exposures through openings 53, 52, 51 of successively increasing area and, therefore, of longer duration of exposure, and the exposure through opening 47 being succeeded by exposures through openings 51, 52, 53 of successively decreasing area and hence of successively decreasing duration of exposure. This produces the effect of a gradual fade in and fade out, respectively, of the successive images on the film which, when the picture is projected, imparts the impression to the observer of a succession of heavier or more sharply defined images of increased intensity and intermediate dim or weak images of gradually decreasing intensity, with the ultimate result of imparting the impression of a smooth and continuous moving action.

In Figs. 13 and 14 I have shown and illustrated the action of a modified structure of a shutter wherein a solid portion 55 and an opening or gap portion 56 of substantially equal areas are formed in the shutter, with a portion of the solid shutter at opposite sides of the gap segment 56 being provided with sets of perforations or openings. These perforations or openings, indicated generally at 57, are arranged in annularly successive radial lines. The individual openings of one line are disposed in staggered relation with respect to those of adjacent lines, and the annular spacial position of each succeeding radial line being separated from the preceding line to a greater distance than that which separates said preceding line from the one which precedes it. In the operation of a shutter of this structure for each complete rotation there will be in each frame a full time exposure through the opening 56 preceded by a succession of under-exposed sections or portions of the image, for example, of a swiftly moving part, the under-exposures being of gradually increasing intensity due to the closer relation of the radial lines of openings 57 towards the opening effected by the gap 56. The reverse of this takes place immediately following the exposure through gap 56, that is a succession of under-exposures of sections of the image which are of decreasing intensity due to the farther spacing apart of the radial lines of perforations from the receding edge of gap 56. The result is that there is produced on the film for each frame an image having a full time, or practically full time, main exposure, with a succession or series of preceding and of following weak, dim image of portions of the rapidly moving parts of the object, which are greatly under-exposed, the duration of the exposures through each of the openings 57, being very small, and the radial and staggered arrangement of said openings causing the portions of the image exposed therethrough to be so rapid as to substantially blend or merge the fast moving parts of the image into a gradually intensified or faded and continued whole image on the film. In this case, when the pictures so recorded are projected the same effect of smoothness and continuity of movement of action is the impression conveyed to the observer of the projected picture, as distinguished from a succession of sharply defined separate images.

In Figs. 15 and 16 I have illustrated still another modified form of shutter wherein intermediate the imperforate portion 58 and the open portion 59 I interpose filter sections 60. In this case each filter section is of increasing density from its line of junction with the gap 59 towards the imperforate section 58 of the shutter. Here again the same effect of the fading in and fading out action of a rapidly moving object is recorded on the film and reproduced in the projected picture. Here again the object sought of avoiding a succession of separate and individual images at different points of movement of a rapidly moving part is avoided and in place thereof when the picture is projected a smooth and continuous moving action is impressed upon the observer.

Having now set forth the objects and nature of my invention, and the manner of carrying out the same, what I claim as new and useful, and of my own invention, and desire to secure by Letters Patent is:

1. A camera shutter for use in taking motion pictures of moving objects, said shutter having an imperforate area to prevent passage of light during the film movement, a main exposure area to permit the passage of light while the film is stationary to secure a dominant exposure of the image upon the film, and other exposure areas intermediate the main exposure and imperforate areas at each end of these areas to permit the passage of light while the film is stationary to secure minor exposures of the image upon the film, said subordinate exposure areas containing groups of openings.

2. A camera shutter for use in taking motion pictures of moving objects, said shutter having an imperforate area to prevent passage of light during the film movement, a main exposure area to permit the passage of light while the film is stationary to secure a dominant exposure of the image upon the film, and other exposure areas intermediate the main exposure and imperforate areas at each end of these areas to permit the passage of light while the film is stationary to secure minor exposures of the image upon the film, said subordinate exposure areas containing groups of openings of respectively increasing dimensions radially of the shutter.

3. A camera shutter for use in taking motion pictures of moving objects, said shutter having an imperforate, main and subordinate exposure areas, the imperforate area effective to cut off the light during the film movement, the main exposure area operating while the film is stationary to permit major exposure and the subordinate exposure areas being located in advance and in the rear respectively of the main exposure area, and operating while the film is stationary to permit minor exposures of the image, said subordinate exposure areas containing openings of relatively increasing dimensions radially of the shutter.

4. A camera shutter for use in taking motion pictures of moving objects, said shutter having an imperforate, main and subordinate exposure areas, the imperforate area effective to cut off the light during the film movement, the main exposure area operating while the film is stationary to permit major exposure and the subordinate exposure areas being located in advance and in the rear respectively of the main exposure area, and operating while the film is stationary to permit minor exposures of the image, said subordinate exposure areas containing openings disposed in staggered relation to each other.

PER JOHAN BERGGREN.